United States Patent
Vajravel (10) Patent No.: US 9,817,779 B2
(45) Date of Patent: Nov. 14, 2017

(54) SYSTEM AND METHODS TO SUPPORT VENDOR DEFINED USB REQUESTS FOR APPLICATION MANAGED USB DEVICES IN VDI ENVIRONMENTS

(71) Applicant: Dell Products L.P., Round Rock, TX (US)

(72) Inventor: Gokul Thiruchengode Vajravel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 178 days.

(21) Appl. No.: 14/834,264

(22) Filed: Aug. 24, 2015

(65) Prior Publication Data

US 2017/0060795 A1     Mar. 2, 2017

(51) Int. Cl.
*G06F 13/42*     (2006.01)
*G06F 3/00*      (2006.01)
*G06F 13/00*     (2006.01)
*G06F 13/366*    (2006.01)
*G06F 13/40*     (2006.01)
*G06F 12/0802*   (2016.01)

(52) U.S. Cl.
CPC ........ *G06F 13/366* (2013.01); *G06F 12/0802* (2013.01); *G06F 13/4068* (2013.01); *G06F 13/4282* (2013.01); *G06F 2212/60* (2013.01)

(58) Field of Classification Search
None
See application file for complete search history.

(56) References Cited

U.S. PATENT DOCUMENTS

| 7,082,598 B1 * | 7/2006 | Le | G06F 9/4413 703/21 |
| 7,478,180 B1 * | 1/2009 | Li | G06F 13/105 703/23 |
| 2013/0072260 A1 * | 3/2013 | Nair | G06F 13/102 455/566 |

* cited by examiner

*Primary Examiner* — David E Martinez
(74) *Attorney, Agent, or Firm* — Baker Botts L.L.P.

(57) ABSTRACT

A redirected USB device that does not fall within well-defined device-classes requires special treatment as redirection software will not always permit the servicing of universal serial bus request blocks (URB) on the same thread that the URBs are received. This results in the redirected USB device not functioning properly. A virtual USB bus driver may intercept the URBs so that a temporary kernel buffer can be created. The temporary kernel buffer stores the data necessary for processing the URBs. The temporary kernel buffer is queued along with the URB so that regardless of the thread for processing the URB, the data associated with the URB is preserved so that the vendor-specific application at the client may properly service any request.

20 Claims, 3 Drawing Sheets

SYSTEM AND METHODS TO SUPPORT VENDOR DEFINED USB REQUESTS FOR APPLICATION MANAGED USB DEVICES IN VDI ENVIRONMENTS

TECHNICAL FIELD

This disclosure relates generally to information handling systems and, more particularly, to URB preserving data associated with universal serial bus block requests so that the vendor-specific application at the client may properly service any request.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

A thin client, or as it is sometimes referred to a lean client or a slim client, is an information handling system or an executable software program running on an information handling system. A thin client generally relies on another information handling system, such as a server, to fulfill at least some of the requested computational roles. For example, a user can access applications or other computational support services from a server by logging into the server from a thin client, for example, a terminal device. Multiple users may log into the same server from multiple terminal devices and may simultaneously request services from the server.

A user may connect a particular universal serial bus (USB) device to a local client device. Many USB devices fall within well-defined device classes, for example, mass storage devices. When devices fall within these well-defined classes, the operating system drivers or equivalent provide all necessary support for the USB device functionalities at the kernel-level itself. When the USB device does not fall within one of the well-defined device classes, the vendor for the USB device provides the necessary support for the USB device either through one or more applications, kernel drivers, etc. Many times the vendor will provide the necessary support via an application and a minimal driver. In general, the application will communicate with the USB device by issuing certain USB request block (URB) commands to the USB device driver. The driver posts the request associated with the command to the USB device from the same thread initiated by the application. That is, the application memory associated with the command and the USB device remains valid.

A problem arises when a USB device is connected by a user that is not within a well-defined class and that USB device is redirected to a server where the USB device is virtualized. When such vendor-specific USB devices are redirected, all the requests associated with the USB device will be queued and serviced in an arbitrary thread. This results in the USB device not functioning properly with the USB redirection/virtualization software.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Particular embodiments are best understood by reference to FIGS. 1-6, wherein like numbers are used to indicate like and corresponding parts.

Figure 1:
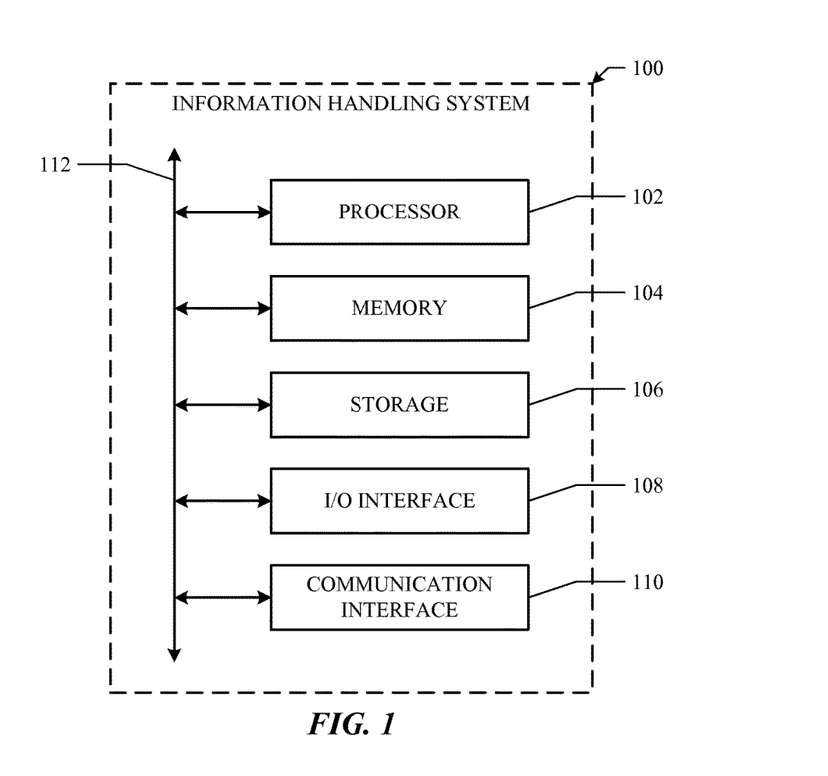
FIG. 1 is a block diagram of selected elements of an information handling system.

FIG. 1 illustrates an example information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, and a bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a USB drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

Figure 2:
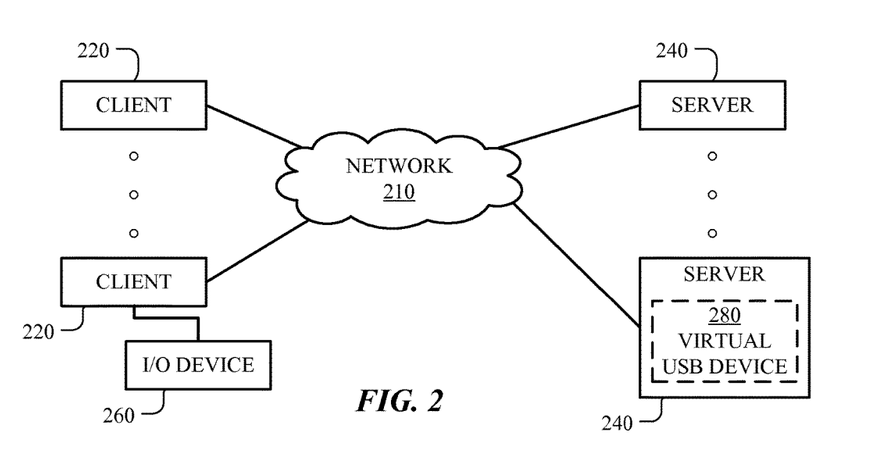
FIG. 2 is an example of a network environment of one embodiment according the present disclosure.

FIG. 2 illustrates an example configuration of networked information handling systems (for example, client devices and servers). In particular embodiments, one or more client devices 220 and one or more servers 240 are connected via network 210. Network 210 may be a public network or a private (for example, corporate) network. Additionally, network 210 may, for example, be a Local Area Network (LAN), a Wide Area Network (WAN), a wireless network, the Internet, an intranet or any other suitable type of network. In particular embodiments, network 210 may include one or more routers for routing data between client devices 220 and/or servers 240. A device (for example, a client device 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (for example, customer sites) or subnets. As an example, a corporate network may include potentially thousands of offices or branches, each with its own subnet (or multiple subnets) having many devices. One or more client devices 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client device 220 may be a desktop computer, a laptop computer, a tablet computer, a handheld device, a mobile phone, a kiosk, a vending machine, a billboard, or any suitable information handling system. In particular embodiments, a client device 220 is an embedded computer and may have flash memory (for example, a solid state drive) instead of a hard disk drive. In particular embodiments, a client device 220 is a thin client having limited processing capabilities and limited storage, and such a thin client may require minimal management and updates. A client device 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (for example, VMware® Virtual Machine), a desktop session (for example, Microsoft Terminal Server), a published application (for example, Microsoft Terminal Server), or any suitable information handling system. As an example, a private (for example, corporate) network may include a device manager server and a repository server each configured to communicate with multiple client devices 220 across one or more domains, sites, or subnets of network 210. In particular embodiments, a server 240 may include one or more servers, or functions of one or more servers. A client device 220 may access software resources provided by a server 240 such as, for example, operating systems, add-ons, content, or any other suitable data, applications, or images. In particular embodiments, a client 220 may access resources provided by a server 240 only after providing suitable authentication information. Alternatively, a server 240 may provide software or other resources automatically to one or more client devices 220.

It may be desirable, in the case of a private (for example, corporate) network including multiple sites or subnets to deploy software (including, for example, all or part of one or more operating systems, applications, add-ons, or data) to one or more client devices 220 across one or more sites or subnets. The client devices 220 may, for example, be located remotely from one or more servers 240 (including, for example, device managers or resource repositories), and as such, there may be challenges in deploying software or other resources to the client devices. As an example, limited connectivity or limited speed due to bandwidth constraints or network latencies may create delays in deploying software. As another example, remote sites or subnets may not include managed components or may not have any personnel with information technology expertise necessary to implement software deployment to client devices at the sites or subnets. Additionally, as the size of operating system images or other content (for example, videos) increases, deploying software or other data to remote sites or subnets may be further delayed. These issues may be further exacerbated in the case of embedded computers such as thin clients, which may have limited processing capability and limited storage space. Traditional approaches involving using a static remote software repository for each subnet or site may not be feasible due to cost or management and monitoring requirements.

In particular embodiments, one or more servers 240 of a network 210 may include a device manager that may manage one or more client devices 220 (for example, thin clients) of one or more sites or subnets of the network. The device manager may, for example, be a software-based management tool that allows for software imaging, software updates, and software configurations to be deployed to the clients from one or more servers. The device manager may also perform any other suitable management function to manage client devices including, for example, enabling or performing (for example, automatically) device discovery, tracking of assets (for example, hardware or software inventory) at client devices, monitoring the status or health of client devices, applying one or more policies to client devices (including, for example, network settings of the client devices), or remote administration and shadowing of client devices. The device manager may deliver any suitable resources including, for example, operating systems, add-ons, content, or any other suitable data, applications, or images to one or more thin client devices 220 of network 210.

In particular embodiments, a client device such as client device 220 may be designed with minimal or limited storage capacity (for example, in a hard disk). The client device may be required, however, to run an operating system such as WINDOWS EMBEDDED or WINDOWS SERVER, but the footprint of such an operating system may grow over time with newer releases or updates. Hence, client devices may, over time, begin to run low on free storage space (for example, in the hard disk). Unwanted files may be deleted or full volume compression of the storage medium (for example, the hard disk) may be implemented to increase available storage space. However, full volume compression may introduce performance shortcomings (for example, increased number of instruction cycles required to compress/uncompress data in the volume) from the point of view of an end user of the client device. In particular embodiments, optimized volume compression may be implemented to reduce effective disk usage on a client device while minimizing impact on system performance.

In particular embodiments, client device 220 (for example, a thin client, a slim client, or a lean client) or one or more software components associated with client device 220 may depend on server 240 to fulfill its computational roles. As an example of a Virtual Desktop Infrastructure (VDI) and not by way of limitation, client device 220 may provide one or more terminal services to one or more users of client device 220. As such, the users of client device 220 may login to the same server 240 and perform tasks on the same server 240 substantially at the same time. In the VDI, one or more I/O devices 260 may be connected to client device 220. In particular embodiments, in order for the I/O devices 260 to work seamlessly, communications associated with the I/O devices 260 may be redirected to a Virtual Desktop (VD) operating system (OS) or a Virtual Machine (VM) OS (for example, WINDOWS SERVER 2003) of the VDI. Furthermore, communications for one or more of the I/O devices 260 may be restricted (for example, limited) only to a particular user session, as in session-level-restriction (SLR) or session-isolation.

SLR may be implemented for many types of I/O devices 260 such as for example, printers, scanners, and storage devices (for example, mass storage, pen drive, hard drive, compact disc (CD), digital video disc (DVD), and BLU-RAY disc). As an example and not by way of limitation, SLR may be implemented for an I/O device 260 that is being operated by a current user or a current user session in a VM OS. In particular embodiments, a third-party kernel filter driver may be layered (for example, loaded) on top of every device class of the I/O device. Accordingly, one or more of the symbolic links in the driver stack for the I/O device 260 at the server 240 may be moved from global namespace to a pre-determined namespace of the user session. Furthermore, the third-party kernel filter driver may block other user sessions (for example, I/O requests of the other user sessions) operating in the VM OS from accessing the device stack. As such, the I/O device 260 may only be accessible by the current user or the current user session.

Figure 3:
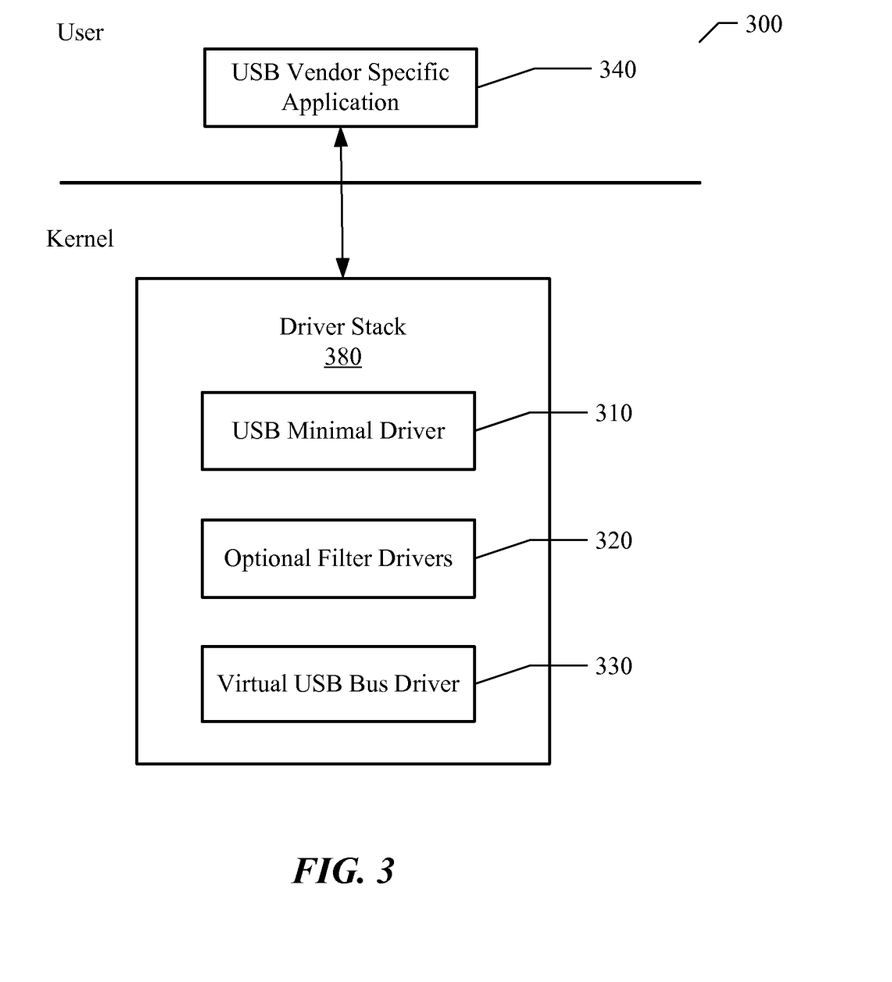
FIG. 3 is an example of a driver stack for one embodiment according to the present disclosure.

FIG. 3 illustrates communication between the driver stack 380 and the USB vendor specific application 340 at the client 220 shown generally at 300. In particular embodiments, a driver stack 380 may comprise a USB minimal driver 310, optional filter drivers 320, and virtual USB bus driver 330 and any other components known to one of ordinary skill in the art. In particular embodiments, an SLR-enabled I/O device 260 may include a single device class (for example, driver) stack 380. As an example and not by way of limitation, a SLR-enabled USB printer may be associated with a printer device driver stack 380 or a printer class stack (for example, WINDOWS Printer Class). As such, the third-party kernel filter driver may only handle the printer device driver stack 380. Herein, reference to a third-party kernel filter driver may encompass a SLR filter driver, or vice-versa, where appropriate. Herein, reference to a device class stack may encompass a driver stack, or vice-versa, where appropriate. In particular embodiments, a SLR-enabled I/O device 260 may have two or more driver stacks 380. Furthermore, the driver stacks 380 may be handled in a coordinated manner. As an example and not by way of limitation, an SLR-enabled USB storage device may include a disk driver stack and a volume driver stack.

In one embodiment, the driver stack 380 comprises a USB minimal driver 310 provided by the vendor of an I/O device 260. For example, a vendor may supply a USB minimal driver 310 for a USB device, such as I/O device 260, when the USB device is not identified with a well-defined device-class. The vendor may also supply an application 340 located at the client 220. The vendor supplied minimal driver 310 may communicate with the application 340 via input/output control (IOCTL) commands. The minimal driver 310 along with the application 340 provide the necessary functionality sustain the operability of I/O device 260.

When the I/O device 260 is redirected, the virtual USB bus driver 330 creates a virtual USB device 280 at the server 240 with the same characteristics of as that of the I/O device 260. In a particular embodiment, the virtual USB bus driver 330 is a Dell Wyse Virtual USB driver. One of ordinary skill in the art would understand that virtual USB bus driver 330 may be any virtual USB bus driver. The virtual USB bus driver 330 will load all the necessary drivers associated with the virtual USB device 280. The virtual USB bus driver 330 services requests to virtual USB device 280 through the USB minimal driver 310. In addition, this USB minimal driver 310 receives the memory of the 'command or data' from the USB vendor specific application 340. These commands or data are posted to the virtual USB bus driver 330 by forming URB of type URB_FUNCTION_VENDOR_DEVICE. The payload of this URB will store the memory address of the 'command or data'. Whenever the virtual USB bus driver 330 receives a URB type URB_FUNCTION_VENDOR_DEVICE request, the virtual USB bus driver 330 creates a temporary buffer. The temporary buffer may be a temporary kernel buffer that is created and stored at the server 240. This temporary kernel buffer stores 'command or data' that is referenced in the URB's payload or transfer buffer contents. When the request from the USB vendor's application is queued, this temporary buffer is also queued so that the memory associated with the request remains with the request. That is, when an I/O device 260 is redirected, the thread does not remain the same when another user or client 220 attempts to access the virtual USB device 280 which causes any memory associated with the request to become invalid. Queuing the request and the temporary buffer maintains the integrity of the memory so that the USB vendor specific application 340 will operate according to the proper data. When a notification is received that an I/O device 260 has been connected to a client 220, the virtual USB bus driver 330 creates a virtual USB device 260 with the same properties as the associated real I/O device (for example, I/O device 260.) For example, if a printer is connected to the parallel port of client 220, the virtual USB bus driver 330 will create a virtual USB printer with the same properties that the local USB printer has that is coupled to client 220. These optional filter drivers shall provide some form of optimization to the device like power saving, encryption, etc.

Figures 4, 6:
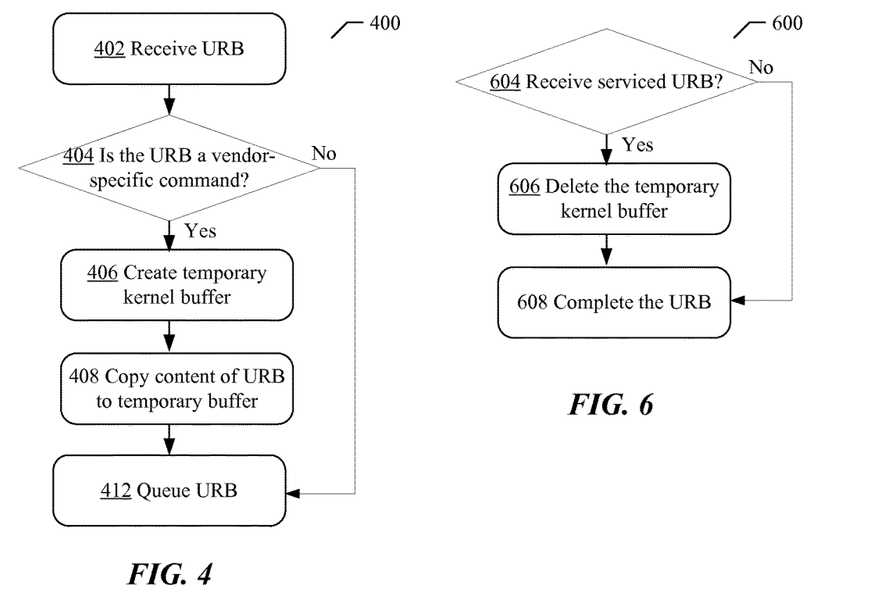
FIG. 4 is an example of a method for one embodiment according to the present disclosure.
FIG. 6 is an example of a method for one embodiment according to the present disclosure.

Shown generally at 400 of FIG. 4 is one embodiment according to the present disclosure for handling URBs received by the upper layers of the driver stack 380. The USB minimal driver 310 receives the memory of the 'command or data' from the USB vendor specific application 340. These commands or data are posted to the virtual USB bus driver 330 by forming URB of type URB_FUNCTION_VENDOR_DEVICE. The payload of this URB is stored in the memory address of the 'command or data'.

At step 402, the virtual USB bus driver 330 receives the URB from its upper driver layers, for example, USB minimal driver 310 and optional filter drivers 320. At step 404, it is determined if the URB is a vendor specific command. For example, an I/O device 260 may be a vendor specific USB device that is not within a well-defined device-class. This vendor-specific USB device 160 may have vendor specific drivers installed and may have an application installed at the client 220 to provide support in processing commands to/from the vendor-specific USB device 260. If the URB is not a vendor-specific command, the method proceeds to step 412.

If it is determined that the URB is a vendor-specific command, then at step 406 a temporary buffer is created in the kernel of the server 240. At step 408, the contents of the URB are copied to the temporary buffer. Then, at step 412, the URB and the temporary buffer are queued.

Figure 5:
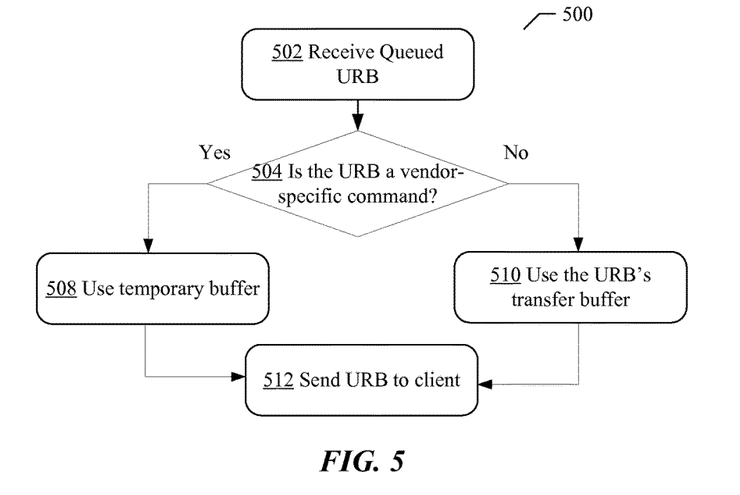
FIG. 5 is an example of a method for one embodiment according to the present disclosure.

Shown generally at 500 of FIG. 5 is one embodiment according to the present disclosure for servicing queued URBs. At step 502 a queued URB is received. A different thread in the Virtual USB Bus Driver 330 walks through the URB queue, de-queues one by one and request the 'URB handler function/method' to handle it. Here, the 'URB handler function/method' receives these queued URBs. FIG. 5 explains a scenario happening within this 'URB handler function/method'. This 'URB handler function/method' is responsible for transferring these URBs over a network, such as network 210 to the I/O device 260 at the client 220.

At step 504 it is determined if the URB is a vendor-specific command. If the URB is a vendor specific command, then at step 508 the temporary buffer created at steps 406 and 408 of FIG. 4 is used to copy/write data for servicing of the URB. If the URB is not a vendor-specific command, then at step 510, the transfer buffer associated with the URB is used. A temporary buffer is not necessary at step 510 as the operating system at the server will be able to handle processing any URB as the virtualized USB device does not require any vendor-specific drivers and thus does not proceed with servicing the URB on a different thread. Steps 508 and 510 proceed to step 512 where the URB is sent to the I/O device 260 at the client 220 (the client 220 coupled to the I/O device 260 associated with the particular virtual USB device 280).

Shown generally at 600 of FIG. 6 is one embodiment according to the present disclosure for completing the serviced URBs. The serviced URB is received from the client 220 at step 604. Once a URB is posted to the I/O device 260 it returns back the URB with appropriate data and/or response. Such URBs are called 'serviced URBs'. At step 606, the temporary buffer created at steps 406 and 408 of FIG. 4 is deleted. At step 608 the URB is sent to the upper layers USB minimal driver 310 and optional filter drivers 320 and finally it reaches the USB vendor specific application 340.

Those of skill in the art would appreciate that items such as the various illustrative blocks, modules, elements, components, methods, operations, steps, and algorithms described herein may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (for example, one or more of blocks, modules, elements, components or processors) for performing one or more functions or operations. In one aspect, such an item may be an apparatus, hardware, or a portion thereof. In one example, an item may have a structure in the form of, for example, an instruction(s) encoded or stored on a machine-readable medium, on another device, or on a portion thereof. An instruction(s) may be software, an application(s), a subroutine(s), or a portion thereof. The instructions(s) may be for performing the function(s) or operation(s). The instruction(s) may be executable by one or more processors to perform the function(s) or operation(s). One or more processors may execute the instruction(s) by, for example, transferring or copying and instructions into an executable memory space and executing the instructions. In one example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (for example, a digital signal processor (DSP), an application specific integrated circuit (ASIC), a field programmable gate array (FPGA), etc.), as a portion(s) of any of the foregoing, or as a combination(s) of any of the foregoing. Those skilled in the art will recognize how to implement the instructions, circuits, and processing systems.

In one aspect of the disclosure, when actions or functions (for example, hooking, modifying, intercepting, redirecting, determining, traversing, obtaining, creating, operating, deleting, removing, receiving, providing, generating, converting, displaying, notifying, accepting, selecting, controlling, transmitting, reporting, sending, or any other action or function) are described as being performed by an item (for example, one or more of blocks, modules, elements, components or processors), it is understood that such actions or functions may be performed, for example, by the item directly. In another example, when an item is described as performing an action, the item may be understood to perform the action indirectly, for example, by facilitating such an action (for example, assisting, allowing, enabling, causing, or providing for, such action to occur; or performing a portion of such an action). For example, determining can refer to facilitating determination, attaching can refer to facilitating attaching, and receiving can refer to facilitating receiving. In one aspect, performing an action may refer to performing a portion of the action (for example, performing a beginning part of the action, performing an end part of the action, or performing a middle portion of the action).

A reference to an element in the singular is not intended to mean "one and only one" unless specifically so stated, but rather "one or more." For example, a client may refer to one or more clients, a server may refer to one or more servers, an operation may refer to one or more operations, and a signal, message, or communication may refer to one or more signals, messages, or communications.

Unless specifically stated otherwise, the term "some" refers to one or more. Pronouns in the masculine (for example, his) include the feminine and neuter gender (for example, her and its) and vice versa. Headings and subheadings, if any, are used for convenience only and do not limit the invention.

A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "coupled" or the like may refer to being directly coupled. In another aspect, the term "coupled" or the like may refer to being indirectly coupled or communicatively coupled.

Various items may be arranged differently (for example, arranged in a different order, or partitioned in a different way) all without departing from the scope of the subject technology. In one aspect of the disclosure, the elements recited in the accompanying claims may be performed by one or more modules or sub-modules. For example, a local link creation module and a local link deletion module may be combined into one module.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving a universal serial request block (URB);
   determining if the URB is a vendor specific command;
   creating a temporary buffer;
   copying contents of the URB to the temporary buffer;
   queueing the contents of the URB and the temporary buffer;
   servicing the URB by using the temporary buffer; and
   sending the URB to a client.

2. The method of claim 1, further comprising:
   posting a data by forming the URB of type URB_FUNCTION_VENDOR_DEVICE.

3. The method of claim 2, wherein the data is a command.

4. The method of claim 1, wherein the vendor specific command is associated with a vendor specific driver.

5. The method of claim 1, wherein the vendor specific command is associated with a vendor specific application.

6. The method of claim 1, wherein the temporary buffer is created in a kernel.

7. The method of claim 1, wherein the URB is received from one or more upper driver layers.

8. One or more computer-readable non-transitory storage media embodying logic that is operable when executed to:
   receive a universal serial request block (URB);
   determine if the URB is a vendor specific command;
   create a temporary buffer;
   copy contents of the URB to the temporary buffer;
   queue the contents of the URB and the temporary buffer;
   service the URB by using the temporary buffer; and
   send the URB to a client.

9. The method of claim 8, further comprising:
   posting a data by forming the URB of type URB_FUNCTION_VENDOR_DEVICE.

10. The method of claim 9, wherein the data is a command.

11. The media of claim 8, wherein the vendor specific command is associated with a vendor specific driver.

12. The media of claim 8, wherein the vendor specific command is associated with a vendor specific application.

13. The media of claim 8, wherein the temporary buffer is created in a kernel.

14. The media of claim 8, wherein the URB is received from one or more upper driver layers.

15. An information handling system comprising:
   one or more processors; and
   a memory coupled to the processors comprising instructions executable by the processors, the processors being operable when executing the instructions to:
      receive a universal serial request block (URB);
      determine if the URB is a vendor specific command;

create a temporary buffer;
copy contents of the URB to the temporary buffer;
queue the contents of the URB and the temporary buffer;
service the URB by using the temporary buffer; and
send the URB to a client.

16. The information handing system of claim 15, further comprising:
posting a data by forming the URB of type URB_FUNCTION_VENDOR_DEVICE.

17. The information handling system of claim 16, wherein the data is a command.

18. The information handling system of claim 15, wherein the vendor specific command is associated with a vendor specific driver.

19. The information handling system of claim 15, wherein the vendor specific command is associated with a vendor specific application.

20. The information handling system of claim 15, wherein the temporary buffer is created in a kernel.

* * * * *